United States Patent [19]

Harris et al.

[11] 4,321,675

[45] Mar. 23, 1982

[54] METHOD AND APPARATUS FOR INCREASING THE DYNAMIC RANGE OF A DATA ACQUISITION SYSTEM AT LOW FREQUENCIES WITHOUT REDUCING HIGH FREQUENCY GAIN

[75] Inventors: Ralph A. Harris; Paul E. Carroll, both of Houston, Tex.

[73] Assignee: Texas Instruments Incorporated, Dallas, Tex.

[21] Appl. No.: 113,854

[22] Filed: Jan. 21, 1980

[51] Int. Cl.³ .......................... G06C 7/48; G01V 1/00
[52] U.S. Cl. .................... 364/421; 364/602; 364/825; 367/43; 367/65
[58] Field of Search ............ 364/825, 724, 421, 604, 364/602; 367/43–46, 65–67, 79; 328/167; 333/166, 167, 174, 175, 176

[56] References Cited

U.S. PATENT DOCUMENTS

| | | | |
|---|---|---|---|
| 3,284,768 | 11/1966 | Newton et al. | 367/65 |
| 3,287,694 | 11/1966 | Romberg | 367/65 |
| 3,525,948 | 8/1970 | Sherer et al. | 367/65 X |
| 3,699,325 | 10/1972 | Montgomery, Jr. et al. | 367/67 X |
| 3,819,864 | 6/1974 | Carroll et al. | 367/67 X |
| 3,919,685 | 11/1975 | Haill | 367/65 |
| 4,086,504 | 4/1978 | Ezell et al. | 367/79 X |

*Primary Examiner*—Joseph F. Ruggiero
*Attorney, Agent, or Firm*—Thomas G. Devine; Melvin Sharp; Rhys Merrett

[57] ABSTRACT

A geophysical data acquisition system is disclosed having a dynamic range larger than that achievable with typical existing systems. The range of input signals that can be accommodated by a system are limited on the lower end by the noise level of the system and at the upper end by saturation levels of the system. High amplitude input signals can be accommodated by the system if certain unneeded frequency components are filtered off at a sufficiently early point in the signal flow path. In the present invention this desirable filtering is accomplished while maintaining a high gain level in the signal flow path ahead of those components which introduce high noise levels. As a result, the system has an expanded dynamic range and the needed capability to faithfully acquire low amplitude signals.

14 Claims, 4 Drawing Figures

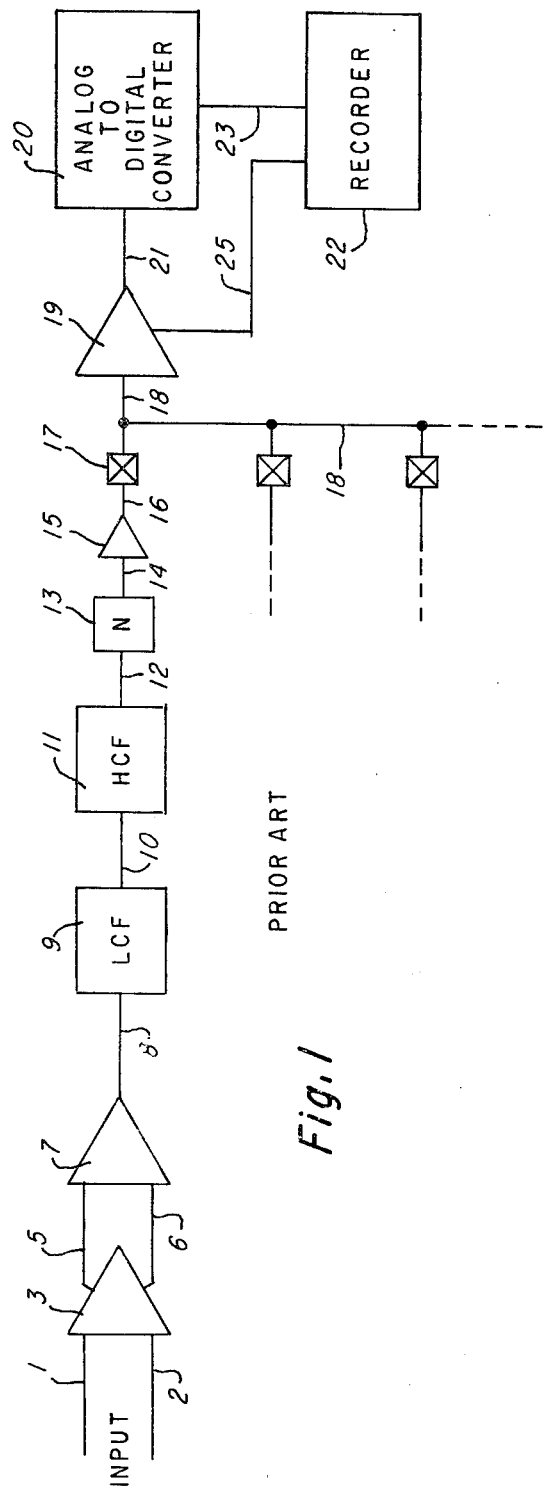
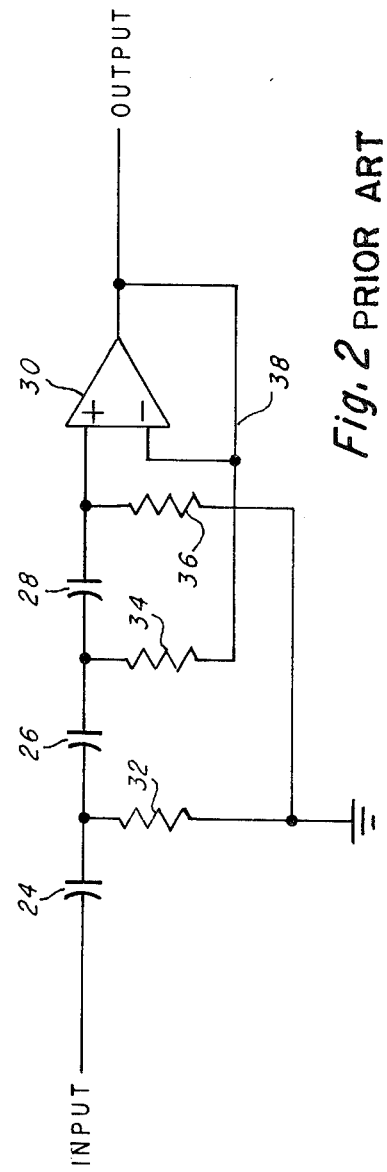
Fig. 1 PRIOR ART
Fig. 2 PRIOR ART

METHOD AND APPARATUS FOR INCREASING THE DYNAMIC RANGE OF A DATA ACQUISITION SYSTEM AT LOW FREQUENCIES WITHOUT REDUCING HIGH FREQUENCY GAIN

This invention relates generally to geophysical data acquisition systems, and more particularly to a geophysical field acquisition system having an expanded dynamic range.

Recording systems for providing a permanent record, typically on magnetic tape, of geophysical data acquired in the field are well known. For the purpose of this disclosure the term "geophysical data" shall include both data acquired in a land prospecting environment where the sensors may be seismometers, geophones, or the like, as well as data acquired in a marine prospecting environment where the sensors may be hydrophones or the like. While such systems typically digitize the acquired data prior to recording, the invention disclosed and claimed wherein is not so limited. A typical digital field recording system is that disclosed in U.S. Pat. No. 3,819,864.

An important parameter of such field acquisition systems is their dynamic range. Dynamic range is defined as the difference between the largest input signal that can be processed and recorded, i.e., the signal having an amplitude just below that which would cause saturation in some element of the system, and the smallest signal which can be properly recorded by the system, as limited by noise levels in the system. Dynamic range is commonly expressed as the ratio of the largest to the smallest signal and is typically expressed in decibels or dB. While recording systems such as that illustrated in U.S. Pat. No. 3,819,864 typically have large dynamic range, sometimes exceeding 100 dB, even these large dynamic ranges have proved inadequate in the demanding environment of present day oil and gas exploration.

To some extent this inadequacy stems from the typical spectral characteristics of the data to be recorded. Partially as a result of the fact that the attenuation of elastic waves in the crustal material of the earth increases more or less logarithmically with frequency, the spectrum of the data to be recorded is typically dominated by low frequency energy. It therefore becomes necessary to filter off the low frequencies in order to be able to detect the high frequencies which are essential to high resolution analysis. It is also common to include high cut anti-alias filters and notch filters in such systems.

Typically, each channel of data coming into prior art field recording systems is amplified in a preamplifier stage. The preamplifiers are followed by a filter bank comprising the low cut, high cut anti-alias, and notch filters. After the filters, further amplification is provided to the signals prior to digitization and recording on magnetic tape.

In such prior art systems the preamplifiers, the filter banks, and the following amplifier stages all add noise to the signals. If the gain of the preamplifier is sufficiently high, even the smallest signal to be recorded by the system will have sufficient amplitude when it reaches the filters and following amplifier stages to be well above the noise level added by those components. In such case the noise, which determines the smallest signal that can be faithfully recorded by the system, is that added by the preamplifier itself. In such a system the high amplitude low frequency signals are filtered off after they have passed through the preamplifier. In some cases these low frequency signals may have sufficient amplitude to saturate the preamplifier.

If the preamplifier gain is reduced so as to avoid saturation by low frequency signals, the noise added by the filters and the following amplifier stages becomes more important relative to the noise added by the preamplifier. As a result, reduction of the preamplifier gain results in increase in the size of the smallest signal that can be faithfully recorded. Thus, while reducing the preamplifier gain tends to increase the dynamic range because larger input signals can be accepted, the increase is not linear since the bottom end of the dynamic range is increasing to a certain extent. If the preamplifier gain is decreased sufficiently, the noise added by the filters and following amplifier stages becomes the dominant noise contributor and no further increase in dynamic range is achieved. Such systems are incapable of providing the required dynamic range while preserving the ability of faithfully record sufficiently small input signals.

Other measures for resolving the problem have been attempted. In some cases large arrays of detectors have been interconnected so as to provide a signal having diminished low frequency energy. Such large arrays, however, are costly to acquire and to deploy. Further, for shallow reflecting beds, large arrays tend to reject even the desired signals.

It is also possible to configure the sensors themselves so that they tend to reject low frequency energy. However, the spectral sensitivity of such sensors is fixed at the time of manufacture and cannot then be changed.

It is therefore an object of the invention to provide a geophysical data acquisition system having a wide dynamic range.

It is a further object of the invention to provide a wide dynamic range system while preserving the ability to record low amplitude signals.

It is another object of the invention to provide a system wherein the dynamic range and/or the equivalent input noise of the system may be switchably selected.

Briefly, these and other objects of the invention are provided by a system wherein the low cut filter is preceded by a pre-filter amplifier stage and succeeded by a post-filter amplifier stage. The post-filter amplifier stage is succeeded by other filters in the system and by further gain stages. Proper selection of the pre-filter and post-filter gain results in the desired dynamic range while preserving satisfactory equivalent input noise levels. In one embodiment of the invention the pre-filter and post-filter gains are selectable so as to provide selectable tradeoffs between the system dynamic range and equivalent input noise level.

Additional objects and advantages of the invention will become apparent from the following detailed description in conjunction with the drawings wherein:

FIG. 1 is a block diagram of a typical prior art geophysical data acquisition system.

FIG. 2 is a schematic diagram of an active low cut filter.

Figure 3:
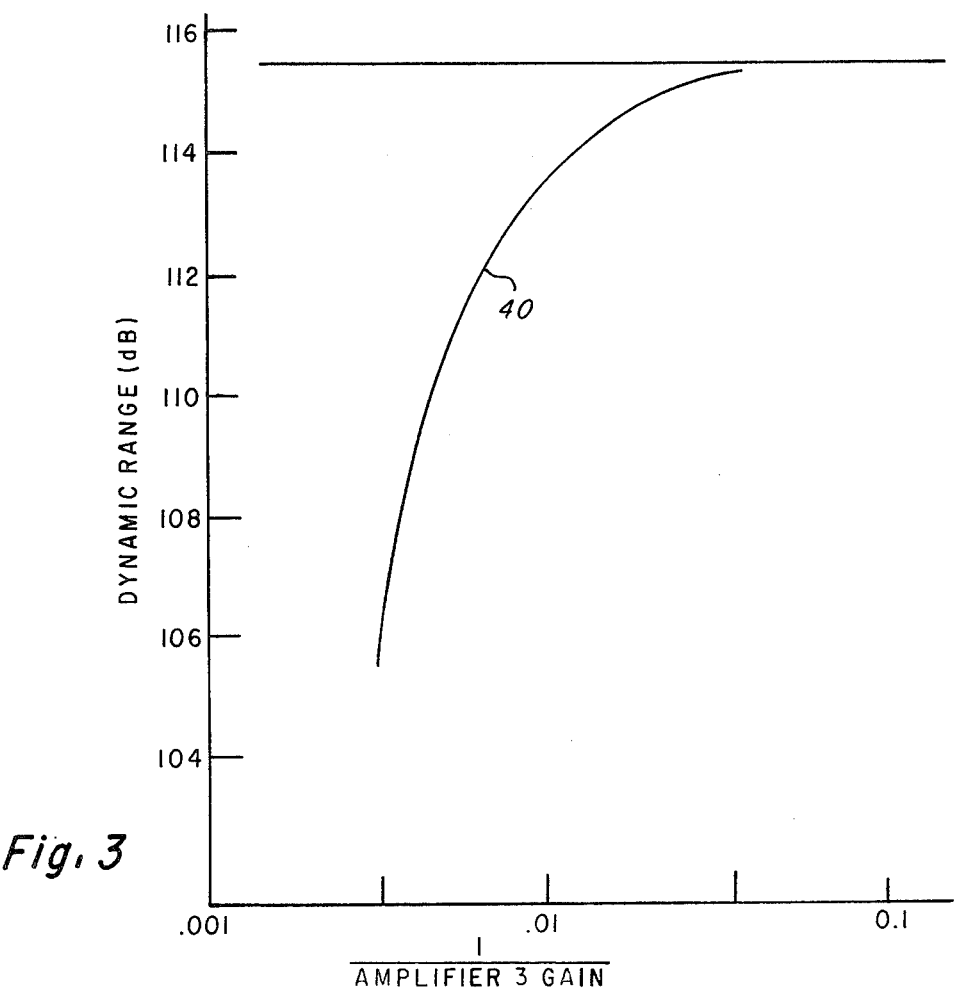
FIG. 3 illustrates variation in dynamic range as a function of preamplifier gain.

FIG. 1 is a block diagram of a typical prior art geophysical data acquisition system. The input to such a system is normally provided by a cable comprised of a plurality of twisted pair signal conductors. In the case of land seismic prospecting, each twisted pair is connected at some remote location to a geophone or geophone group. In the case of marine prospecting, the twisted pairs are enclosed in a streamer which is towed behind the prospecting boat and are connected at remote locations to hydrophones or hydrophone groups. In either case a plurality of channels of data are available to be recorded by the data collection system. Each twisted pair provides a differential signal which is not referenced to ground.

With reference to FIG. 1, one such signal is coupled to a channel of the data collection system by lines 1 and 2. The signal enters differential amplifier 3 which in turn provides a differential output on lines 5 and 6 to differential amplifier 7. Amplifier 7 functions to provide a high common mode rejection and to convert the differential signal to a single ended signal on line 8. Amplifiers 3 and 7 comprise a preamplifier. Preferably amplifier 3 should have a low equivalent input noise and a high gain. The high gain will amplify the received signals to a sufficiently high level that the noise contributed by the following devices is insigificant relative to the noise contribution of amplifier 3. Amplifier 7 typically has a gain near unity.

Other means for coupling the cable signals to the data collection system are known including those disclosed in U.S. Pat. Nos. 3,778,759 and 3,972,020.

The preamplifier output is coupled by line 8 to low cut filter 9. The function of low cut filter 9 is to attenuate low frequency signals. The use of an active filter as contrasted with a passive filter provides substantial savings in size, weight and cost. Typically, one or more three-pole active filters such as that illustrated in FIG. 2 is/are used. The input signal is coupled by the series combination of capacitors 24, 26 and 28 to the non-inverting input of amplifier 30. The junction between capacitors 24 and 26 is returned to ground through resistor 32 while the non-inverting input of amplifier 30 is returned to ground through resistor 36. One hundred percent negative feedback is effected by coupling the output of amplifier 30 through line 38 to the inverting input of the amplifier. In addition, the amplifier output is coupled by line 38 and resistor 34 to the junction between capacitors 26 and 28. Such active filters are well known and in a typical embodiment will have component values as follows:

Capacitor 24: 2 microfarads
Capacitor 26: 1 microfared
Capacitor 28: 1 microfared
Resistor 32: 8.236K
Resistor 34: 7.56K
Resistor 36: 63.22K With the values given above, the three-pole active filter has a cut off frequency of eight hertz and a slope of 18 dB per octave at frequencies below the cutoff.

Returning to FIG. 1, line 10 couples the output of the low cut filter to a high cut filter 11. The high cut filter attenuates high frequencies and typically has a slope of 72 dB per octave. Since the analog signals are to be sampled and digitized at a later point in the system, the steep slope of high cut filter 11 is used to assure that frequencies above one-half the sampling frequency are attenuated by at least 70 dB.

The output of high cut filter 11 is coupled by line 12 to notch filter 13. The reject band of notch filter 13 is centered at the power line frequency so as to attentuate any pickup from nearby power lines. High cut filters and notch filters are well known in the art and require no further discussion here. In some systems it has been known for the notch filter to preceed the high cut filter or for the high cut filter to precede the low cut filter.

The output of the notch filter is coupled by line 14 to the input of a low drift DC amplifier 15. Typically, the amplifier has a gain of unity and a low output impedance. The low drift requirement stems from the fact that the remainder of the data acquisition system is DC coupled. The output of amplfier 15 is coupled by line 16 to multiplexer switch 17. Multiplexer switch 17 is typically a semiconductor switch which is closed for a very brief period so as to provide a sample of the data from the illustrated channel via line 18 to the input of floating point amplifier 19.

That portion of the data collection system described to this point, that is the channel between the input signal and line 18 is duplicated for each channel of input data to be recorded by the system. The various multiplexer switches such as switch 17 are successively closed for brief periods so as to provide on line 18 a continuous succession of analog samples from the various data channels.

These various samples, after amplification by amplifier 19, are coupled by line 21 to analog-to-digital converter 20. The digitized output signals are coupled by line 23 to a recorder 22 which in the preferred embodiment comprises a magnetic tape recorder. The geophysical data recording system thus provides on magnetic tape digitized samples of the multichannel analog data received from the cable.

Most high quality analog-to-digital converters in current use have a dynamic range of 80 to 90 dB. This is not sufficient to accomodate the dynamic range of typical geophysical input signals which may exceed 120 dB. Floating point amplifier 19 has the capability to automatically adjust its gain for each new data sample as the sample is received on line 18. The gain is adjusted so as to insure that the amplified signal appearing on line 21 will fall within the acceptable range of the analog-to-digital converter. The actual gain setting of amplifier 19 is provided to recorder 22 on line 25 for recordation along with the corresponding digitized sample appearing on line 23. One example of a suitable floating point amplifier is that disclosed in U.S. Pat. No. 3,684,968. Specific embodiments of various components illustrated in FIG. 1 appear in a digital field system supplied by Texas Instruments Incorporated of Dallas, Texas under the trademark DFS V.

In the discussion to follow the noise amplitudes introduced at various points in the system will be referred back to the system input and expressed as equivalent input noise. To do this, the amplitude of the noise at the point where the noise is introduced is divided by the total gain of all the amplifiers preceding that point in the system. The resultant equivalent input noise is that noise amplitude that would have to appear at the input of a noise free system to result in the noise level that is in fact generated at the point in question in the actual noisy system. Noise amplitudes will be expressed in terms of their RMS value. Also, it will be assumed that the nature of the noise is such that the RMS value of the total noise from a plurality of noise sources can be expressed as the square root of the sum of the squares of the noise from each of the sources.

In a typical prior art system amplifier 3 has a gain of 320 and an equivalent input noise of 0.103 microvolts RMS. As a result of this gain level, the noise introduced by devices in the system is divided by 320 to obtain their equivalent input noise. Amplifier 7 typically has a noise level of 0.64 microvolts. It will be assumed that two 18 dB per octave low cut filters are used each having a typical noise level of 0.88 microvolts. The high cut filter, notch filter, low drift amplifier, multiplexer and floating point amplifier typically have a noise level of about 11 microvolts. The equivalent input noise then resulting from all sources is given by Equation 1.

$$\text{Equivalent Input Noise} = \left\{ (.103)^2 + \left(\frac{.64}{320}\right)^2 + 2\left(\frac{.88}{320}\right)^2 + \left(\frac{11}{320}\right)^2 \right\}^{\frac{1}{2}} \tag{1}$$
$$= .109 \text{ microvolts}$$

It will be seen that because of the high gain of amplifier 3, the dominant noise contributor in the system illustrated is amplifier 3 itself.

The maximum peak output signal that can be handled by amplifier 7 without saturation is largely dictated by the available power supply voltage and typically has a value of about 9.3 volts. Converting the 9.3 volts peak to a corresponding RMS value and dividing by the gain of amplifier 3 yields 20.48 mv RMS as the maximum input signal. Therefore, the dynamic range of the illustrated system is given by equation 2.

$$\text{Dynamic Range} = 20.48 \times 10^{-3}/.109 \times 10^{-6} \tag{2}$$
$$= 187,890 \ (105.5 \text{dB})$$

A dynamic range of 105 dB sometimes proves to be inadequate since input signals larger than 20.48 mv are received resulting in saturation of the system. To allow for such large signals the gain of amplifier 3 may be made manually adjustable. Typically, the gain can be adjusted in 4 to 1 gain steps. For the various gain levels available in such a system, Table 1 gives the corresponding equivalent noise levels and dynamic ranges.

TABLE I

| Amplifier 3 Gain | Equivalent Input Noise | Dynamic Range |
| --- | --- | --- |
| 320 | .109 μv | 105.5 dB |
| 80 | .173 μv | 113.5 dB |
| 20 | .564 μv | 115.3 dB |
| 5 | 2.22 μv | 115.4 dB |

As the gain of amplifier 3 is decreased there is a corresponding increase in the amplitude of the input signal that can be handled by the system without going into saturation. Thus, reductions in the gain of amplifier 3 tend to result in increases in the dynamic range of the system. The increase is not linear, however. The reason for this is that decreases in the gain of amplifier 3 result in corresponding increases in the equivalent input noise levels for noise sources appearing after amplifier 3 in the system. This results in increases in the total equivalent input noise of the system and the amplitude of the smallest signal that can be faithfully recorded by the system increases. Ultimately noise sources appearing after amplifier 3 in the system become the dominant noise sources and further reductions in the gain of amplifier 3 result in no perceptable increase in dynamic range. This is illustrated graphically in FIG. 3 where curve 40 shows the value of dynamic range corresponding to various values of amplifier 3 gain. For convenience of illustration the abscissa of FIG. 3 is the inverse of the amplifier 3 gain. It is seen that as the gain is reduced more and more the dynamic range asymptotically approaches the limiting value of 115.45 dB. In many cases this limiting value of dynamic range and the associated high total equivalent noise levels are inadequate.

Figure 4:
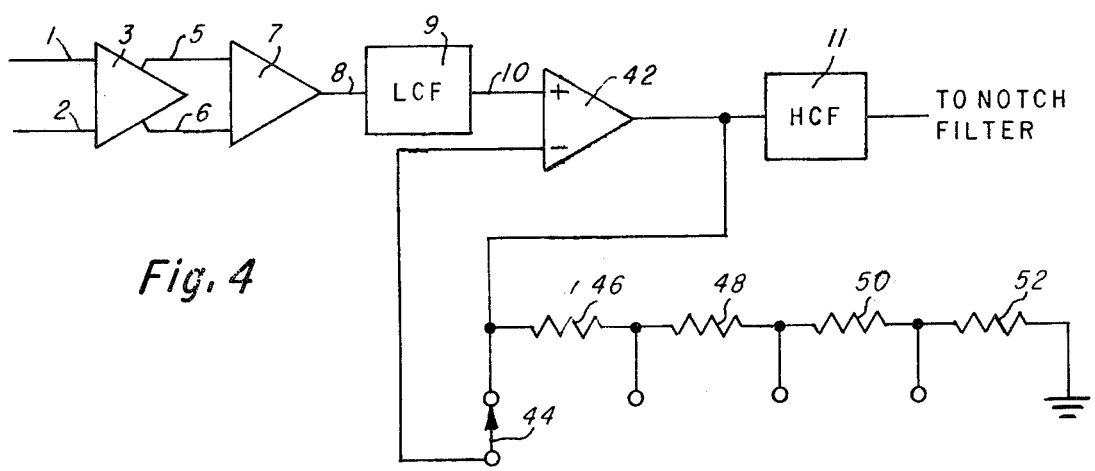
FIG. 4 shows the input portion of each channel of the acquisition system of the present invention.

In the geophysical data acquisition system of the present invention, the input portion of each data channel has the configuration illustrated in FIG. 4. The preamplifier comprising amplifiers 3 and 7, the low cut filter 9, and high cut filter 11 may each be similar to the corresponding components appearing in the prior art structure of FIG. 1. In particular, amplifier 3 preferably has a gain which may be changed by an operator. In the structure of the present invention the output of low cut filter 9 is not coupled directly to the input of high cut filter 11. Instead amplifier 42 provides additional gain to the signal coming from low cut filter 9. The actual gain of amplifier 42 is selected through the expedient of positioning manual or electronic selectable switch 44, thereby establishing the amount of negative feedback utilized around the amplifier. The resistance R of resistor 52 in the preferred embodiment is one thousand ohms. If resistors 50, 48 and 46 have resistances of 3R, 12R and 48R respectively, it will be recognized that for the four switch positions illustrated in FIG. 4, the gain of amplifier 42 will be 1, 4, 16, or 64. In the practice of the invention, the gain settings of amplifiers 3 and 42 may be independently selectable. Alternatively, the switching may be coordinated so that the product of the gains of amplifiers 3 and 42 will always have a constant value, i.e., 320. In such a case when the gain of amplifier 3 is 320 the gain of amplifier 42 will be 1. Other combinations of the two gains are 80/4, 20/16 and 5/64. In explaining the advantages of the present invention, the coordinated method of gain switching will be assumed.

In the prior art structure of FIG. 1, with the gain of amplifier 3 set to a high level, i.e., 320, large signals received at the input would tend to saturate amplifiers 3 or 7. It may be expected that it would be the final stages of the amplifiers which would saturate.

In the structure in the present invention as illustrated in FIG. 4, the preamplifier is split into two sections. Amplifiers 3 and 7 will be referred to as the pre-filter gain while amplifier 42 will be referred to as the post-filter gain. Then when the pre-filter gain is set to something less than 320, i.e., 20, the post-filter gain would be 16. In such a case it might be expected that saturation, if it were to occur, would occur in amplifier 42. However, prior to reaching amplifier 42 the large low frequency components are removed by low cut filter 9. The remaining high frequency components in amplifier 42 are normally not of sufficient magnitude to saturate the amplifier. As a result, saturation is avoided even in the presence of large low frequency components while maintaining the total preamplifier gain at a high level of 320. It is important to maintain the total preamplifier gain at a high level so that the equivalent input noise contributed by the high cut filter and succeeding components is negligable in comparison with the equivalent input noise contributed by amplifier 3. It will be recalled from the discussion in connection with equation 1 that this noise at the point in the system where it is generated has an RMS level of about 11 microvolts. When the 11 microvolts is divided by the preceding gain of 320 the equivalent input noise corresponding thereto is small in comparison with 0.103 microvolts. In the configuration of FIG. 4 the only equivalent input noise component that varies as a function of the preamplifier gain setting is that component contributed by the low cut filter. It will be recalled that each low cut filter stage has an RMS noise value of about 0.88 microvolts which is quite small in comparison with the 11 microvolt value for the high cut filter and succeeding system components. The low cut filter noise does not become an appreciable component of the total equivalent input noise until the gain of amplifier 3 has been reduced to an extremely low level.

Table II summarizes the total equivalent input noise and the dynamic range of the system for various combinations of prefilter and postfilter gain. Comparison of the data of Table II with that of Table I shows that by means of the present invention the dynamic range is substantially increased over that achievable with prior art systems while the total equivalent input noise is maintained at an acceptable level. It should be noted that the dynamic range figures of Table II are applicable only for low frequency signals, that is signals which are substantially filtered by the low cut filter. This is not an objectionable limitation since signals at frequencies not removed by the low cut filter are rarely if ever of an amplitude that would saturate the system.

TABLE II

| Pre-Filter Gain | Post-Filter Gain | Equivalent Input Noise | Dynamic Range |
|---|---|---|---|
| 320 | 1 | .109 $\mu$ v | 105.5 dB |
| 80 | 4 | .110 $\mu$ v | 117.4 dB |
| 20 | 16 | .129 $\mu$ v | 128.1 dB |
| 5 | 64 | .301 $\mu$ v | 132.8 dB |

It will be seen that typical prior art structures include a relatively low noise pre-amplifier. These structures also include a filter section which may generate noise of a level comparable to or slightly greater than that of the pre-amplifier section. Finally, the prior art structures include a high noise data processing section which generates noise levels significantly greater than either those of the preamplifier section or the filter section. In the cascade combination of the present invention the preamplifier section is split into a pre-filter amplifier and a post-filter amplifier. The pre-filter gain is chosen to be sufficiently high so that the equivalent input noise contribution of the filter section is smaller than that of the pre-filter amplifier itself. However, the gain of the pre-filter amplifier is chosen to be sufficiently low so that the low frequency components which are ultimately eliminated by the low cut filter do not saturate the pre-filter amplifier itself. The post-filter gain is selected so that, when taken in combination with the pre-filter gain, the overall gain preceding the high noise data processing section is sufficiently high to ensure that the noise contribution of the high noise data processing section when referenced to the input of the post-filter amplifier, is less than that of the filter section.

In this description of the invention and in the claims, the term "low noise amplifier" is intended to mean an amplifier having a noise level equal to or less than that of the low cut filter. Similarly, the term high noise data processing means is intended to include that portion of the system which generates noise substantially greater than that generated by the low cut filter.

While the advantages of the invention have been disclosed under the assumption that changes in prefilter gain are coordinated with changes in postfilter gain so as to maintain a constant overall preamplifier gain of 320, the invention is not so limited. In fact, in the preferred embodiment of the invention the pre-filter gain is fixed while the post-filter gain is variable. Also by way of example the pre-filter gain can be set to 20 and the post-filter gain set to 4. In this case with the total preamplifier gain at a value of 80, the total equivalent input noise will be found to have an RMS value of 0.186 microvolts. This is just slightly larger than the corresponding 0.173 microvolt level in the prior art structure with the preamplifier gain set to 80. On the other hand the dynamic range available in the new structure will be found to be 124.9 dB as contrasted with 113.5 dB for the prior art structure.

Also, while the invention has been disclosed with only the low cut filter located prior to the post-filter gain, it may sometimes be desirable to also include part of the high cut filter ahead of the post-filter gain. Such would be the case, for example, if high levels of high frequency energy are present in the input signal. It is sometimes possible to move part of the high cut filter further forward in the amplifier chain without substantially degrading the total equivalent input noise.

While there have been described what are presently considered to be the preferred embodiments of this invention, it will be obvious to those skilled in the art that various changes and modifications may be made therein without departing from the invention, and it is therefore, intended to cover all such changes and modifications as fall within the true spirit and scope of the invention.

What is claimed is:

1. In a geophysical data acquisition system with at least one data channel having low noise preamplifier means, filter means and high noise data processing means and cascade combination comprising:
   (a) pre-amplifier means comprising a post-filter amplifier and a pre-filter amplifier for amplifying an input signal,
   (b) filter means coupled to the output of said pre-filter amplifier, and
   (c) high noise data processing means coupled to the output of said post-filter amplifier.

2. The combination of claim 1 wherein the gain of at least one of said pre-filter and post-filter amplifiers is variable.

3. The combination of claim 2 wherein the gains of both of said pre-filter and post-filter amplifiers are variable, and wherein the gain variations are such that the overall gain of the combination of the two amplifiers remains equal to a preselected constant value.

4. The combination of claim 1 wherein said high noise data processing means includes a floating point amplifier.

5. The combination of any of claims 1-4 wherein said filter means includes a low cut filter.

6. In a geophysical data acquisition system having filter means for removing certain frequency components of a received input signal and further having a high noise section, and wherein the level of the noise contributed by said high noise section, when referenced to the input of the section substantially exceeds the level of the noise contributed by said filter means, the combination comprising:
   (a) at least one channel having an input section including said filter means,
   (b) said high noise section, and
   (c) pre-amplifier means, comprising a pre-filter section for providing an input to said filter means, and a post-filter section, for amplifying the output of said input section and for providing the resultant amplified signal to said high noise section, said pre-amplifier means having at least one gain setting sufficiently high that the level of the noise contributed by said high noise section, when referenced to the input of said pre-amplifier means does not substantially exceed the level of the noise contributed by said filter means.

7. The combination of claim 6 wherein the gain of at least one of said pre-filter amplifier and said post-filter amplifier means is variable.

8. The combination of claim 7 wherein the gains of both of said pre-filter amplifier and said post-filter amplifier means are variable, and wherein the gain variations are such that the overall gain of the combination of the two amplifiers remains equal to a preselected constant value.

9. The combination of claim 6 wherein said high noise section includes a floating point amplifier.

10. The combination of any of claims 6-9 wherein said filter means includes a low cut filter.

11. A multichannel geophysical data acquisition system comprising:

(a) a plurality of data channels, each of said data channels further comprising,
  (i) pre-amplifier means comprising a pre-filter amplifier and a post-filter amplifier,
  (ii) a filter section coupled to the output of said pre-filter amplifier and to the input of said post-filter amplifier, and
  (iii) a DC amplifier for further processing the signal produced by said post-filter amplifier,
(b) a multiplexer for time division multiplexing the outputs of said plurality of data channels,
(c) a floating point amplifier,
(d) an analog-to-digital converter, and
(e) recording means for providing a permanent record of the digitized signals.

12. The system of claim 11 wherein the gains of said pre-filter and post-filter amplifiers are variable.

13. The system of claim 12 wherein the gain variations of said pre-filter and post-filter amplifiers are such that the overall gain of the combination of the two amplifiers remains equal to a preselected constant value.

14. The system of claims 11, 12 or 13 wherein the filter section comprises a low cut filter.

* * * * *